Dec. 1, 1936.  E. D. CODDINGTON  2,062,398
STUD
Filed Nov. 1, 1935
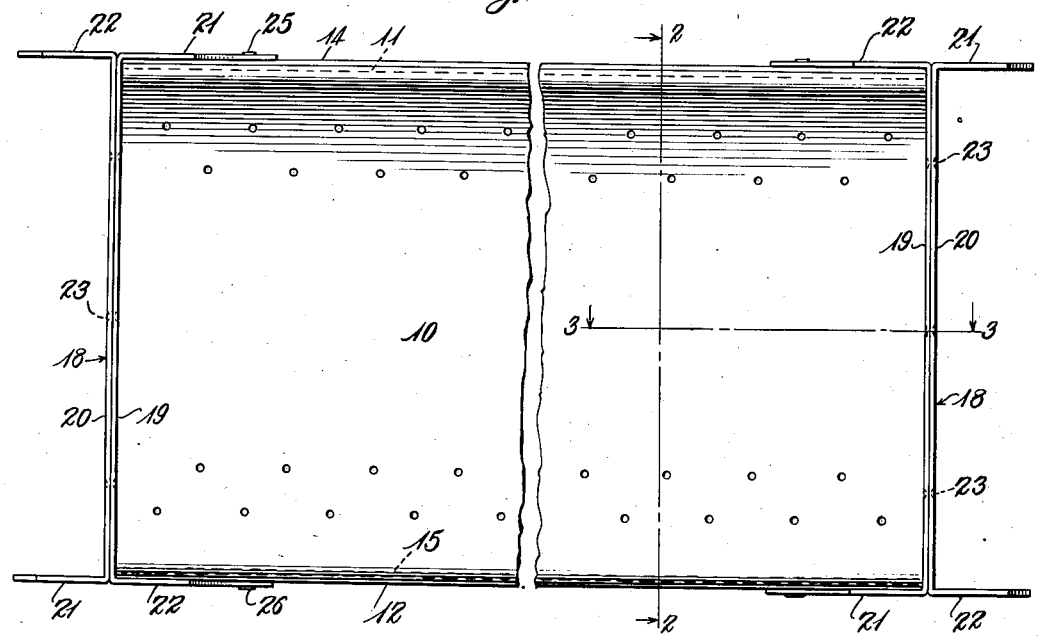
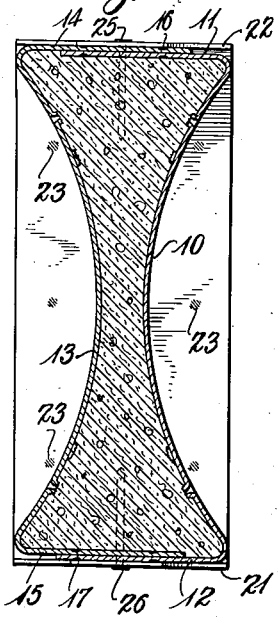
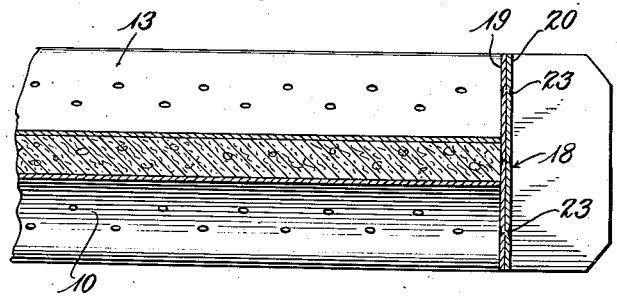
Inventor
Edwin D. Coddington
By Richard K. Stevens
Attorney Patented Dec. 1, 1936

2,062,398

UNITED STATES PATENT OFFICE 2,062,398

STUD

Edwin D. Coddington, Milwaukee, Wis., assignor to Reynolds Corporation, New York, N. Y., a corporation of Delaware Application November 1, 1935, Serial No. 47,866

5 Claims. (Cl. 72—115)

The present invention has to do with a stud and relates to a structure of paired opposed metal members joined by spot welding or the like and filled with a nailable cementitious material. The present invention constitutes an improvement upon the stud described and claimed in my copending application Ser. No. 39,024 filed September 3, 1935.

The objects of the invention include, among others, the following:

Simplification of structure of metal stud members by reducing the number of parts and the number of operations necessary for assembly;

The construction of studs from a limited number of like members which may be inexpensively fabricated and which when joined possess great strength; and A combination of metal and nailable cementitious material in a simple but strong structure to form a stud which is superior in many ways to the ordinary "two by four".

These objects, and such others as may hereinafter appear, are obtained by the novel construction, unique combination, and improved arrangement of the several elements which constitute the invention, one embodiment of which is illustrated in the accompanying single sheet of drawings, hereby made a part of this specification, and in which:

Figure 1 is a fragmentary side elevation of a stud embodying the subject matter of the present invention, the stud being shown with end members;

Figure 2 is a transverse section of the stud shown in Figure 1 taken on the line 2—2 of said figure; and Figure 3 is a longitudinal section of the stud heretofore mentioned taken on the line 3—3 of Figure 1.

Like reference characters are used to designate similar parts in the drawing and in the description of the invention hereinafter given.

The stud herein described comprises, except for the end pieces, two metallic sheets or strips suitably bent and folded. One of said strips has an arcuate section 10, an inturned flange at one edge of the arcuate section and designated 11, and a second inturned flange at the other end of the arcuate section and designated 12.

Flanges 11 and 12 are parallel and are of suitable width. The second member of the stud comprises an arcuate section 13 of the same configuration as the arcuate section 10, but opposed thereto. Section 13 has at its edges flanges 14 and 15 which are parallel to flanges 11 and 12. Member 13 may be of the same width as member 10 so that the flanges 14 and 15 overlie and underlie the flanges 11 and 12 respectively.

When so associated, the overlapping portions of flanges 11 and 14 are joined by spot welding 16 and the overlapping portions of flanges 12 and 15 are joined by spot welding 17. The extent of the underlap of flanges 11 and 15 with flanges 14 and 12 is a matter of choice. It is not necessary that the flange 14 extend over the entire surface of the flange 11 or that the flange 11 extend into contact with the body of the arcuate section 13.

Likewise at the opposite edge of the stud it is not necessary for the flange 12 to extend completely over flange 15 or for flange 15 to extend into marginal contact with the arcuate section 10.

After the two members 10 and 13 are joined together by spot welding or otherwise, a cementitious fill is deposited in the casing thus formed. This fill may comprise a mixture of gypsum, Portland cement and sawdust represented approximately in the proportion, by weight, 55:20:9 respectively. This material may be packed into the sheet metal casing in a dry state and moisture then introduced through perforations 26 into the filling material after which the material sets into a hardened core capable of having nails driven thereinto without cracking or crumbling and which tenaciously retains the nails against withdrawal. This manner of fabricating composite structural members is more particularly described in my copending application Serial No. 39,022 filed September 3, 1935. If end pieces 18 like those illustrated in Figures 1 and 3 are to be employed, the fill does not extend to the ends of the casing for approximately two or three inches. This is for the purpose of facilitating the attachment of the end pieces.

The end pieces 18 shown in Figures 1 and 3 and which are being claimed in my application Serial No. 39,029 filed September 3, 1935, each comprise two opposed U-shaped members 19 and 20. Each of said members has a closed side and flanges 21 and 22. The flanges 21 and 22 of the member 19 telescope over an end of the stud. The flanges 21 and 22 upon the second and external U-shaped member 20 are for use in attaching the stud to another stud member or dimension member. The flanges 21 and 22 on member 20 may be of less length than flanges 21 and 22 on member 19, or vice versa. The U-shaped members 19 and 20 are joined together by a series of spot welds 23 and the fabricated end pieces 18 are attached to the stud by filling the ends of the casing with a nailable cementitious mix, either of the same or a different nature than that described above, telescoping the flanges 21 and 22 of member 19 over the ends of the stud, and then driving nails 25 and 26 through the legs 21 and 22 of the U-shaped member 19 into the mix within the interior of the stud, and laying the stud with the end piece so attached aside for the mix to dry. The end pieces are optional. If desired they may be attached when the stud is used. Any stud may be shortened on a job and an end piece attached after such shortening.

A stud of the structure described and illustrated has great strength. The two arcuate side members 10 and 13 are joined together in a manner which prevents relative movement therebetween. They will strongly resist torsional or twisting end-to-end strain which may be applied thereto. They will not buckle, even under great weight. They will not bend between ends under wind or other pressure applied between the ends. The cost of production or fabrication is slight because of the limited amount of spot welding required. It is also possible to fabricate such a stud by continuous movement through a spot welding machine, such machine welding the stud at opposite sides at spaced intervals, the stud frame being advanced intermittently predetermined distances. The cementitious fill may be conveniently inserted after the fabrication of the casing is complete. The fill and attachment of the end pieces may be made at an extremely low cost.

The core is of sufficient width and depth to receive nails in the usual manner. It completely fills the interior of the stud and resists lateral compression of the casing. The double thickness of the stud at the nailing edges increases the shearing resistance to the retraction of any nail once inserted thereinto. The core prevents any tendency of the casing to bend inwardly (which is the natural way for the metal parts 10 and 13 to deform) and increases the strength of the stud to withstand the usual compression stresses to which a stud is subjected.

I claim:

1. A stud comprising paired opposed arcuate members of nail-penetrable material having terminal tangential flanges, and a nailable cementitious core enclosed by said members and their flanges, the flanges of said members being associated in reverse overlapped relation.

2. A stud comprising paired opposed arcuate members of nail-penetrable material having flanges at their edges, the flanges of one member alternately overlying and underlying the corresponding flanges of the other member, and a nailable cementitious core enclosed by said members and their flanges.

3. A stud comprising a nail-penetrable metal casing and a nailable cementitious core, the metal casing comprising a pair of correspondingly shaped members having arcuate side walls of a single lamination of metal, and top and bottom walls of two laminations of metal.

4. A stud comprising a nail-penetrable metal casing and a nailable cementitious core, the metal casing being composed of a pair of counterpart, opposed, arcuate members having parallel superposed flanges, complemental flanges of the members being joined by spot welding and providing nailing faces of double thicknesses of metal and the inner and outer faces of the flanges of one member contacting the outer and inner faces of the flanges of the other member.

5. A stud comprising a nail-penetrable metal casing and a nailable cementitious core, the metal casing being composed of a pair of counterpart opposed members having parallel superposed flanges, complementary flanges of the members alternately overlying and underlying their companion flanges upon two faces of the stud and providing nailing faces of a double thickness of metal, and the inner and outer faces of the flanges of one member contacting the outer and inner faces of the flanges of the other member.

EDWIN D. CODDINGTON.